Dec. 19, 1950   L. R. POIRIER ET AL   2,534,680
FOOD HOLDING UNIT
Filed March 8, 1949

INVENTORS
L. R. Poirier
U. E. Provost
BY
ATTORNEYS

Patented Dec. 19, 1950

2,534,680

UNITED STATES PATENT OFFICE 2,534,680

FOOD HOLDING UNIT

Leonard R. Poirier, Stockton, and Vernon E. Provost, San Francisco, Calif.

Application March 8, 1949, Serial No. 80,156

4 Claims. (Cl. 211—77)

This invention is directed to, and it is an object to provide, a novel, food holding unit, such unit being especially designed, but is not limited, for use to hold baby foods in separate, open-topped but normally covered, removable containers.

Another object of the invention is to provide a food holding unit which comprises a novel slotted supporting disc for the reception, in dependent and removable relation, of the initially separate, open-topped food containers; there being a lid common to the supported containers normally covering the same, and such lid—when in a lowered position—also serving to retain the containers against escape from the supporting disc.

A further object of the invention is to provide a food holding unit, as in the preceding paragraph, in which the supporting disc for the containers is rotatable to facilitate access to, and removal of, a selected one of said containers.

It is also an object of the invention to provide a food holding unit which is designed for ease and economy of manufacture, especially molding from plastic.

A still further object of the invention is to provide a practical and convenient food holding unit, and one which will be exceedingly effective for the purpose for which it is designed.

These objects are accomplished by means of such structure and relative arrangement of parts as will fully appear by a perusal of the following specification and claims.

Figure 1:
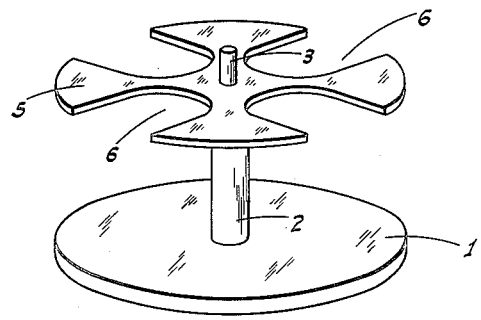
Fig. 1 is a perspective view of the slotted, container-supporting disc and its mount; the lid and containers being omitted.

Referring now more particularly to the characters of reference on the drawings, the food holding unit comprises a circular base 1 having a post 2 upstanding centrally therefrom; the upper end of such post being reduced in diameter to form a top spindle 3 and a shoulder 4 at the lower end of said spindle.

The numeral 5 indicates a horizontal disc which is turnably mounted on the spindle 3, and which disc rests on, and is supported by, the shoulder 4.

The disc 5 is formed with a plurality of relatively deep slots 6 therein in circumferentially spaced relation; said slots opening to the periphery of the disc for the purpose of receiving, by lateral inward motion, cylindrical containers 7; such containers 7 being open-topped and including a laterally outwardly projecting peripheral flange 8. This peripheral flange 8 of each container 7 rests atop the disc 5 when the container is engaged in one of the slots 6 in depending relation to said disc 5. In this manner the containers 7 are effectively suspended from the disc 5 but can be readily and conveniently removed by laterally outward sliding motion.

The following arrangement is provided for the purpose of normally covering all of the supported containers 7, and additionally releasably locking the same against lateral escape from the disc 5.

A circular lid 9 normally overlies the disc 5 in concentric relation; said circular lid including a central, upstanding boss 10 having a downwardly opening, axial bore 11 therein.

The spindle 3 projects above the disc 5 into the bore 11 whereby to locate the circular lid 9. Additionally, this arrangement permits the lid 9 to be lifted some distance without escape from the spindle 3.

The circular lid 9 is of slightly greater diameter than the disc 5, and a peripheral flange 12 depends from the lid 9 laterally outwardly of, but adjacent, the periphery of the disc 5.

When the circular lid 9 is in its normal lowered position it rests directly on top of the laterally outwardly projecting peripheral flanges 8 of the containers 7, thus closing or sealing the same at the top, so that food in the containers is thus protected and preserved.

Figure 2:
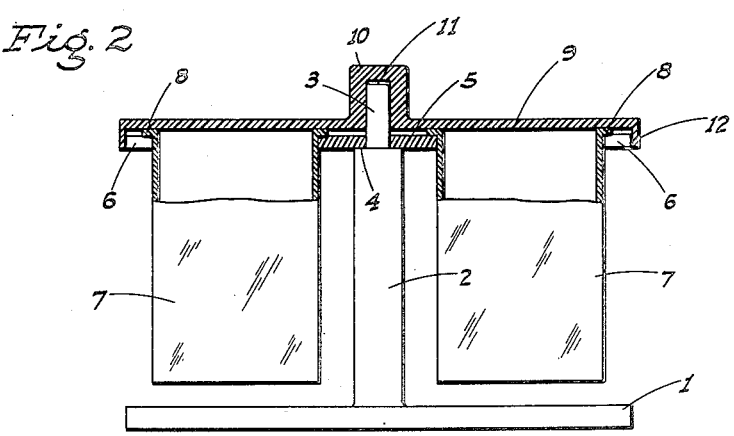
Fig. 2 is an elevation, partly in section, of the food holding unit completely assembled, and with the lid retaining and covering the containers.

Additionally, when the lid 9 is in its lowered position the containers 7 are effectively baffled against escape from the slots 6 by the dependent peripheral flange 12. See Fig. 2.

Figure 3:
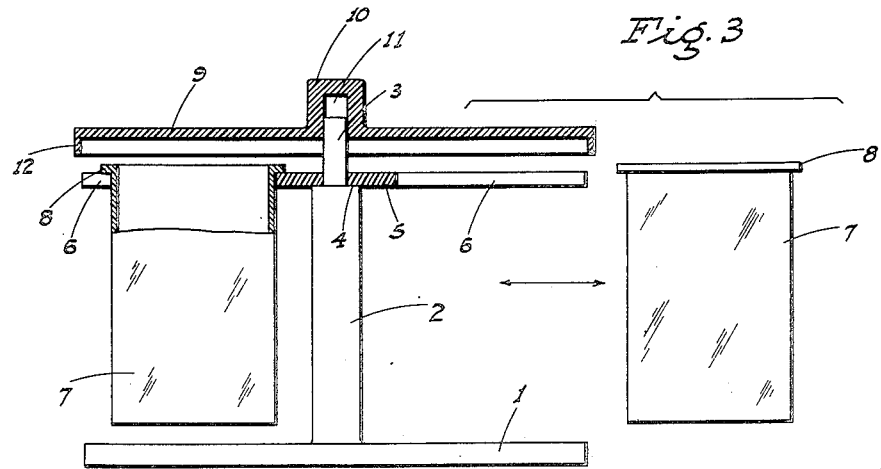
Fig. 3 is a similar view, but shows the lid raised, and one container withdrawn from the slotted supporting disc.

When it is desired to remove one or more of the containers 7 from the food holding unit, the circular lid 9 is lifted slightly by finger engagement with the boss 10; the dependent peripheral flange 12 then being in a horizontal plane which permits any container 7 to be slid or shifted laterally outwardly from the disc 5. See Fig. 3.

The described food holding unit is especially useful for the containing and preserving of foodstuffs in a refrigerator or the like; the device being compact, and yet the containers being quickly removable when desired.

Although the food holding unit is primarily designed for baby foods, its use is not limited thereto.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A food holding unit comprising a mount, an upwardly facing disc on the mount, a plurality of containers, the disc having apertures through which the upper portions of the containers extend, and laterally outwardly projecting elements on the upper end of the containers slidably resting atop the disc whereby said containers removably depend from said disc.

2. A food holding unit comprising a base, a post upstanding from the base, a vertical spindle on the upper end of the post, a horizontal disc rotatably mounted on the spindle, a plurality of open-top food containers, said disc having a plurality of circumferentially spaced container receiving notches therein open to the periphery of said disc, and laterally projecting flanges on the upper end of the containers resting on the top of the disc when the containers are engaged in and depend from the notches whereby the containers may be removed from the disc upon outward horizontal movement only of said containers.

3. A food holding unit comprising a base having an upstanding post, a horizontal disc turnably mounted on the upper end of the post, a plurality of open topped food containers of a lesser depth than the height of the post, means removably suspending the containers from the disc and a vertically movable lid to engage and cover all the containers, mounted in connection with the post for rotation with the disc when said lid is resting on the containers.

4. A food holding unit comprising a base having an upstanding post, a horizontal disc turnably mounted on the upper end of the post, a plurality of open topped food containers of a lesser depth than the height of the post, the disc having apertures cut in from the periphery of a size to completely receive the containers, a rim flange on each container to overlap and engage the disc to support the container therefrom and permitting of removal of the container from the disc upon horizontal outward sliding movement of such container, a spindle upstanding from the post axially thereof, and a lid to engage and cover all the containers simultaneously, said lid having a peripheral depending flange engaging about the periphery of the disc when the lid is resting on the containers and having an upstanding central handle-forming boss provided with a bore slidably and turnably engaging over the spindle.

LEONARD R. POIRIER.
VERNON E. PROVOST.

REFERENCES CITED

The following references are of record in the file of this patent:

UNITED STATES PATENTS

| Number | Name | Date |
|---|---|---|
| 905,975 | Anderson | Dec. 8, 1908 |
| 1,698,489 | Bickford | Jan. 8, 1929 |
| 1,759,140 | Silberger | May 20, 1930 |
| 1,977,400 | Offery et al. | Oct. 16, 1934 |
| 2,121,711 | Potts | June 21, 1938 |